(12) United States Patent
Kato (10) Patent No.: US 7,623,147 B2
(45) Date of Patent: Nov. 24, 2009

(54) OPTICAL SCANNING DEVICE AND IMAGE FORMING APPARATUS USING THE SAME

(75) Inventor: Manabu Kato, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/134,398

(22) Filed: Jun. 6, 2008

(65) Prior Publication Data

US 2008/0304863 A1    Dec. 11, 2008

(30) Foreign Application Priority Data

Jun. 6, 2007    (JP)    ............... 2007-150301

(51) Int. Cl.
  *B41J 2/435*    (2006.01)
  *B41J 2/47*    (2006.01)
(52) U.S. Cl. ..................... 347/235; 347/250
(58) Field of Classification Search ................ 347/231, 347/234–235, 248–250, 255, 259–261; 359/204, 359/213.1; 250/235
See application file for complete search history.

(56) References Cited

U.S. PATENT DOCUMENTS

| 4,307,408 | A | * | 12/1981 | Kiyohara et al. | ............. | 347/255 |
| 4,720,632 | A | * | 1/1988 | Kaneko | ....................... | 250/235 |
| 5,084,616 | A | * | 1/1992 | Morimoto | .................. | 250/235 |
| 5,438,450 | A | | 8/1995 | Saito | ........................... | 359/216 |
| 5,684,524 | A | * | 11/1997 | Hokamura | .................. | 347/259 |
| 6,970,275 | B2 | * | 11/2005 | Cannon et al. | ........... | 359/213.1 |
| 7,154,640 | B2 | * | 12/2006 | Ishihara | ...................... | 358/474 |
| 7,274,499 | B2 | | 9/2007 | Kato | ........................... | 359/216 |
| 2007/0263270 | A1 | * | 11/2007 | Komai et al. | ................ | 359/204 |

FOREIGN PATENT DOCUMENTS

| JP | 6-202016 A | | 7/1994 |
| JP | 9-203876 | | 8/1997 |
| JP | 9-203876 A | | 8/1997 |
| JP | 09203876 A | * | 8/1997 |

* cited by examiner

*Primary Examiner*—Hai C Pham
(74) *Attorney, Agent, or Firm*—Fitzpatrick, Cella, Harper & Scinto (57) ABSTRACT

An optical scanning device includes a synchronism detecting element for detecting a light beam scanningly deflected by a deflecting surface of an optical deflector, to determine an image-writing start position of the light beam on a scan surface in a main-scan direction, and a synchronism detecting optical element for directing the light beam scanningly deflected by the optical deflector to the synchronism detecting element, wherein the synchronism detecting optical element is comprised of a prism having a plurality of reflecting surfaces being unified and having a power in a sub-scan direction, and wherein, in a sub-scan section, the prism is configured to place the deflecting surface of the optical deflector and a light-receiving surface of the synchronism detecting element in an optically conjugate relationship with each other.

3 Claims, 7 Drawing Sheets

OPTICAL SCANNING DEVICE AND IMAGE FORMING APPARATUS USING THE SAME

FIELD OF THE INVENTION AND RELATED ART

This invention relates to an optical scanning device and an image forming apparatus using the same. The present invention is suitably usable in an image forming apparatus such as a laser beam printer (LBP), a digital copying machine or a multifunction printer, for example, having an electrophotographic process.

In the optical scanning device used in an image forming apparatus such as a conventional laser beam printer (LBP), the light beam emitted from light source means 1 is modulated in accordance with an image signal.

Then, the light beam emitted from the light source means 1 is periodically and scanningly deflected by an optical deflector 5 which comprises a polygon mirror.

The light beam scanningly deflected by the optical deflector is imaged into a spot shape by an imaging optical system having a fθ characteristic, on the surface of a photosensitive member surface 8, whereby image recording is performed.

Figure 9:
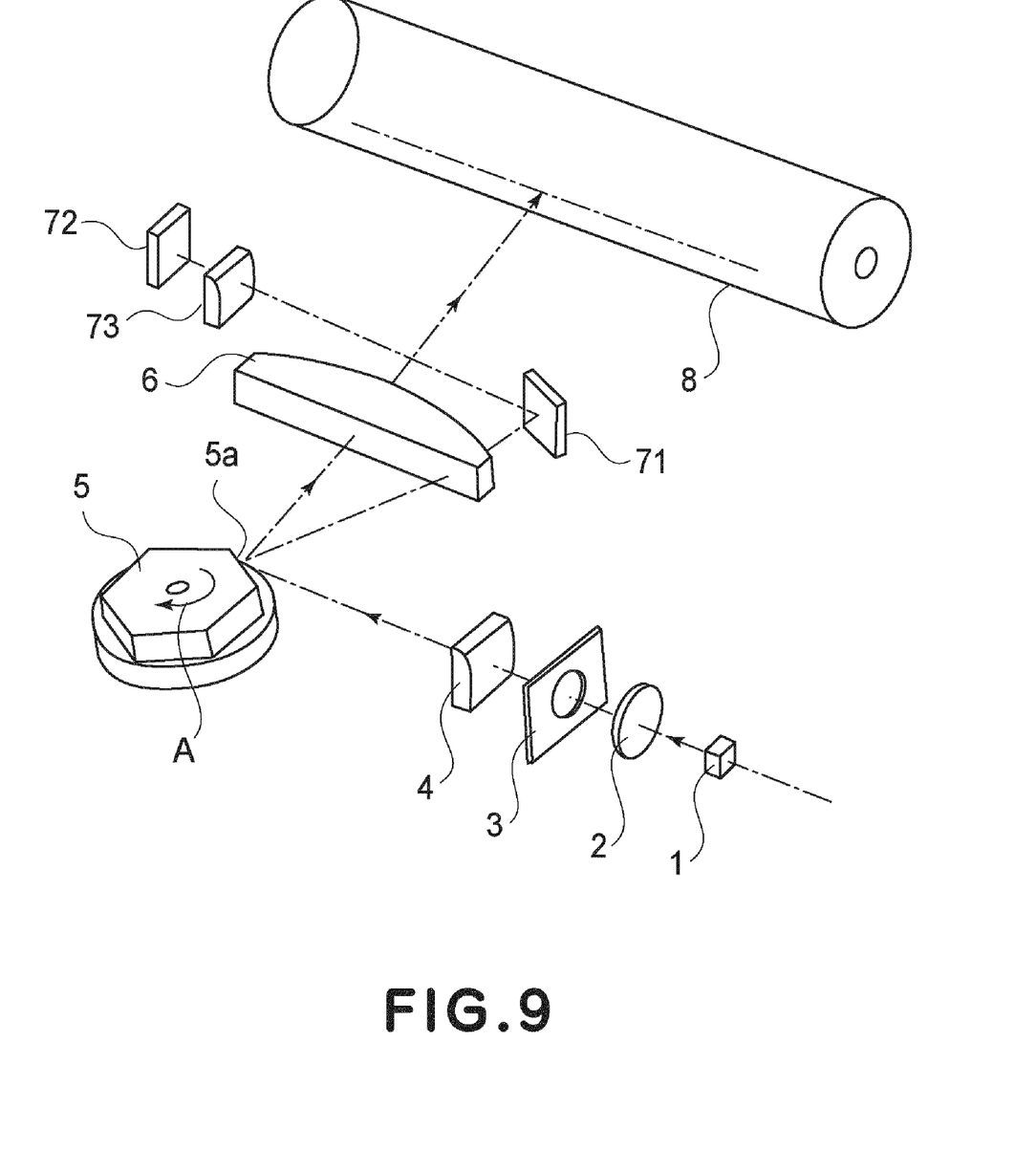
FIG. 9 is a perspective view of an optical scanning device of a conventional example.

FIG. 9 is a schematic diagram of a conventional optical scanning device.

In FIG. 9, the divergent light beam emitted from light source means 1 is converted into parallel light by a collimator lens 2.

Then, the light beam converted into a parallel light beam passes through an aperture stop 3, by which the light beam width is restricted. Thereafter, the light beam enters a cylindrical lens 4.

Within the main-scan section, the light beam incident on the cylindrical lens 4 having a power only in the sub-scan direction goes out of the same in the state of a parallel light beam.

Furthermore, within the sub-scan section, the light beam projected from the cylindrical lens 4 is imaged as a line image upon the deflecting surface 5a of an optical deflector 5.

The light beam scanningly deflected by the optical deflector is imaged on the photosensitive material surface 8 through an imaging lens 6 having a fθ characteristic.

Then, in the main-scan section, by rotating the optical deflector 5 in the direction of an arrow A, the photosensitive material surface 8 is scanned with the light beam.

A portion of the light beam scanningly deflected by the optical deflector 5 is collected by the imaging lens 6, and it is directed to a synchronism detecting element 72 by way of a synchronism detecting mirror 71.

Then, based on the light beam detected by the synchronism detecting element (synchronism detection sensor) 72, a synchronizing signal is generated, such that, on the photosensitive member surface 8, synchronism of the image-writing start timing of the light beam in the main-scan direction is controlled.

It is to be noted that, in order to correct surface tilt of the synchronism detecting mirror 71, there is a synchronism detecting tilt correcting lens 73 disposed on the light path before the synchronism detecting element 72, for placing the synchronism detecting mirror 71 and the synchronism detecting element 72 in a conjugate relationship with each other within the sub-scan section (see Patent Document No. 1).

[Patent Documents]
No. 1: Japanese Registered Patent No. 2830670 (Paragraphs 0019 and 0026, FIG. 1)
No. 2: Japanese Laid-Open Patent Application No. 9-203876 (Paragraphs 0041-0046, FIG. 4)

In optical scanning devices, in recent years, a compact and high-precision optical system has been required to meet the tendency of further reduction in size and improvement in image quality of the image forming apparatus such as a laser beam printer (LBP).

Particularly, with regard to the synchronism detecting optical system for detecting the image-writing start timing of the light beam in the main-scan direction, reduction in size and improvement in image quality are strongly desired because of placement of electric wirings for the synchronism detecting element 72 or restriction of disposition within the optical scanning device (optics box).

In consideration of this, in Patent Document No. 1, a plurality of reflecting mirrors (synchronism detecting mirrors) are provided along a light path between the optical deflector and the synchronism detecting element separately, to bend the light path between the optical deflector and the synchronism detecting element, thereby to reduce the size of the synchronism detecting optical system.

However, since a plurality of reflecting mirrors are provided along the light path, as compared with a structure in which only one piece of reflecting mirror is provided on the light path, the disposition error of reflecting mirrors of the plurality of reflecting mirrors would increase, causing a problem that the synchronism detection precision drops.

Due to the disposition error of each reflection surface of the plurality of reflection surfaces, the amount of imaging position deviation of the light beam incident on the light-receiving surface of the synchronism detection sensor 72 undesirably enlarges.

This problem leads to degradation of the synchronism detection precision.

If these reflection surfaces are disposed on the light path while being spatially separated from each other, in order to adjust the imaging position deviation of the light beam incident on the light-receiving surface of the synchronism detection sensor 72, the reflection surfaces have to be adjusted individually. This makes the adjustment quite complicated.

Furthermore, since the reflecting mirrors have to be disposed at plural locations inside the optical scanning device, the design flexibility will be lowered due to the dispositional limitation of the reflecting mirrors.

In order to solve such problem, in Patent Document No. 2, the synchronism detecting optical element is comprised of a prism in which two reflection surfaces being orthogonal to each other in the sub-scan section are unified and which has a power in the sub-scan direction.

In Patent Document No. 2, the light entrance surface of the prism and two orthogonal reflection surfaces are comprised of a plane surface, while the light exit surface is comprised of a toric surface having a positive power.

However, Patent Document 2 does not mention the possibility that, in the sub-scan section, due to the difference in the quantity of surface tilt of each deflecting surface, the position of the light beam deflected by the respective deflecting surfaces of the rotary polygonal mirror and incident on the light receiving surface of the synchronism detection sensor varies.

Furthermore, Patent Document No. 2 does not disclose that, in sub-scan section, the deflecting surface of the rotary polygonal mirror and the light-receiving surface of the synchronism detection sensor are placed in an optically conjugate relationship with each other by means of a prism.

SUMMARY OF THE INVENTION

The present invention provides an optical scanning device by which the synchronism detecting optical system can be made compact without complicating the adjustment of the deviation of irradiation position of the light beam incident on the light-receiving surface of the synchronism detection sensor.

In accordance with an aspect of the present invention, there is provided an optical scanning device, comprising: light source means; an optical deflector configured to scanningly deflect a light beam emitted from said light source means; an imaging optical system configured to image the light beam scanningly deflected by a deflecting surface of said optical deflector, upon a scan surface to be scanned; a synchronism detecting element configured to detect the light beam scanningly deflected by the deflecting surface of said optical deflector, to determine an image-writing start position of the light beam on the scan surface in a main-scan direction; and a synchronism detecting optical element configured to direct the light beam scanningly deflected by the deflecting surface of said optical deflector to said synchronism detecting element; wherein said synchronism detecting optical element is comprised of a prism having a plurality of reflecting surfaces being unified and having a power in a sub-scan direction, wherein, in a sub-scan section, said prism is configured to place the deflecting surface of said optical deflector and a light-receiving surface of said synchronism detecting element in an optically conjugate relationship with each other.

According to the present invention, the synchronism detecting optic element is comprised of a prism having a plurality of reflection surfaces which are unified and having a power in the sub-scan direction. Furthermore, by means of the prism, in the sub-scan section, the deflecting surface of the optical deflector and the light-receiving surface of the synchronism detecting element are placed in an optically conjugate relationship with each other. Hence, compactification of the synchronism detecting optical system is accomplished without lowering the synchronism detection precision.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

In the present invention, the main-scan direction is defined as a direction in which a light beam is scanningly deflected by a deflecting surface of an optical deflector.

The sub-scan direction is defined as a direction which is parallel to a rotational axis of the optical deflector.

Furthermore, the main-scan section is defined as such plane that an axis parallel to the sub-scan direction is a normal to that plane.

Furthermore, the sub-scan section is defined as such plane that an axis parallel to the main-scan direction is a normal to that plane.

Furthermore, the deflective scan surface is defined as a surface at which the light beam is scanningly deflected by the deflecting surface of the optical deflector.

Embodiment 1

Figure 1:
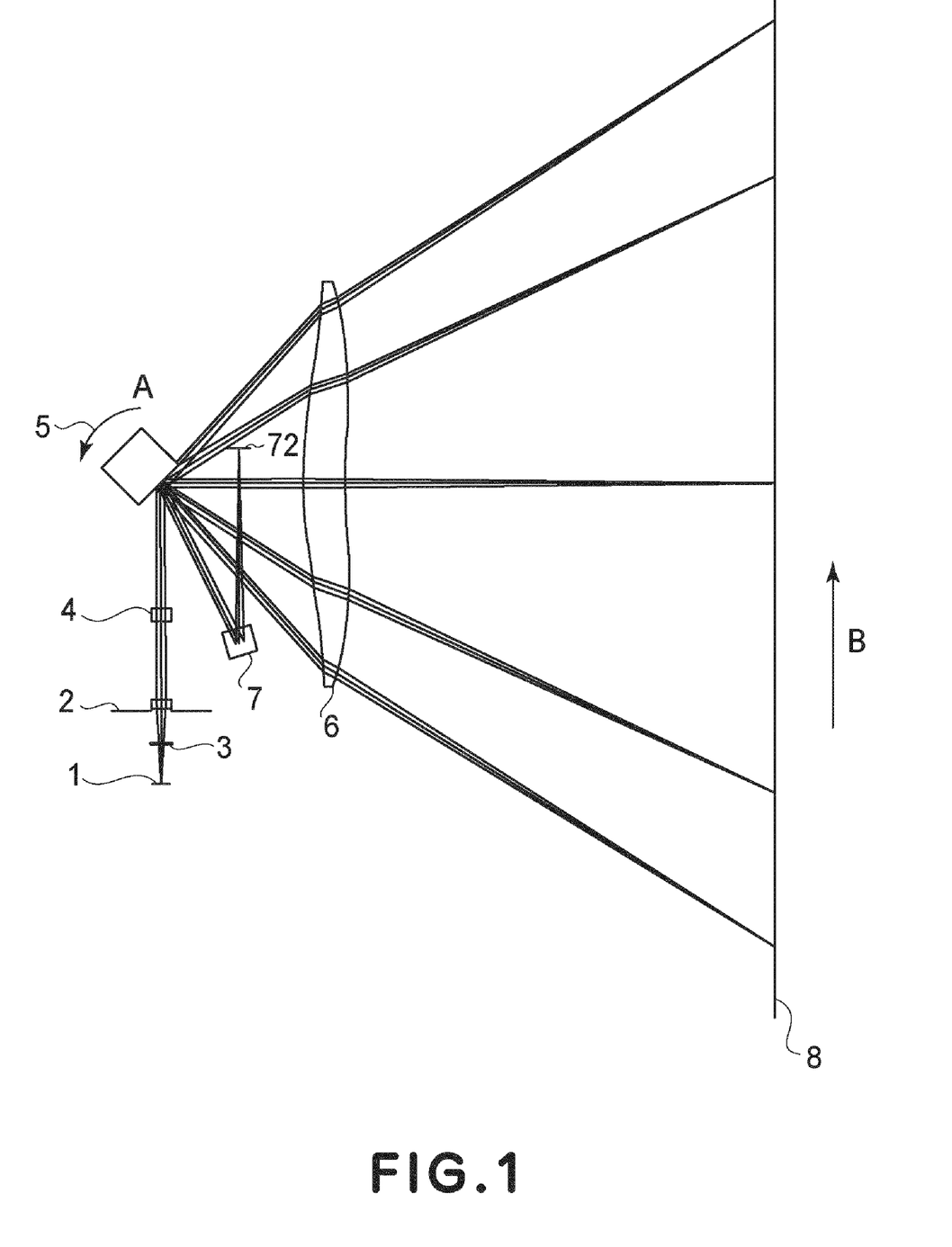
FIG. 1 is a main-scan sectional view of an optical scanning device according to a first embodiment of the present invention.

FIG. 1 is a main-scan sectional view of an optical scanning device according to a first embodiment of the present invention.

In FIG. 1, a divergent light beam emitted from a semiconductor laser 1 which is light source means is converted into parallel light by a collimator lens 2.

The light beam converted into parallel light goes through a stop 3 by which the width (light quantity) of the light beam is restricted. Then, it is incident on a cylindrical lens 4 having a power only in the sub-scan direction.

Since the cylindrical lens 4 has no power, in the main-scan direction the light beam passed through the cylindrical lens 4 is incident on a rotary polygonal mirror 5 which is an optical deflector, as a parallel light beam in the main-scan section.

Furthermore, within the sub-scan section, the light beam passed through the cylindrical lens 4 is imaged on the deflecting surface of the rotary polygonal mirror 5 which is an optical deflector, by the cylindrical lens 4 having a power in the sub-scan direction.

The collimator lens 2, stop 3 and cylindrical lens 4 constitute an input optical system.

Thus, the light beam incident on the rotary polygonal mirror 5 which is an optical deflector forms a line image being elongated in the main-scan direction.

The light beam incident on the rotary polygonal mirror 5 which is an optical deflector is scanningly deflected by the swinging motion of the rotary polygonal mirror 5 in the direction of an arrow A by a motor.

The light beam deflected by the deflecting surface of the rotary polygonal mirror 5 which is an optical deflector is incident on an imaging optical element 6 having an fθ characteristic, constituting an imaging optical system.

In the present embodiment, the imaging optical element constituting an imaging optical system is comprised of one piece of plastic toric lens 6. However, the present invention is not limited to this.

Plastic toric lens 6 has different powers in the main-scan direction and the sub-scan direction, respectively, and it serves to image the light beam scanningly deflected by the deflecting surface of the rotary polygonal mirror 5 upon a scan surface 8 to be scanned.

Here, the toric lens 6 is a lens having a positive power both in the main-scan direction and the sub-scan direction.

The plastic toric lens 6 functions to place the deflecting surface of the rotary polygonal mirror 5 and the scan surface 8 where a photosensitive drum is to be disposed, in an optically conjugate relationship with each other within the sub-scan section.

Thus, it provides surface tilt correction for the deflecting surfaces of the rotary polygonal mirror 5 which has four deflecting surfaces in this example.

The light beam scanningly deflected by the deflecting surface of the rotary polygonal mirror 5 with the swinging motion of the rotary polygonal mirror 5 in the direction of an arrow A, scans the scan surface where a photosensitive drum (photosensitive member) is disposed, in the direction of an arrow B.

On the other hand, a synchronism detecting light beam which is a portion of the light beam scanningly deflected by the deflecting surface of the rotary polygonal mirror (polygon mirror) 5, is incident on a synchronism detecting optical element 7 without passing through the toric lens 6.

The synchronism detecting optical element 7 is comprised of a reflection type optical prism having two refracting surfaces and two reflecting surfaces.

The two reflecting surfaces of the reflection prism 7 define a right angle in the sub-scan section therebetween.

Figure 2:
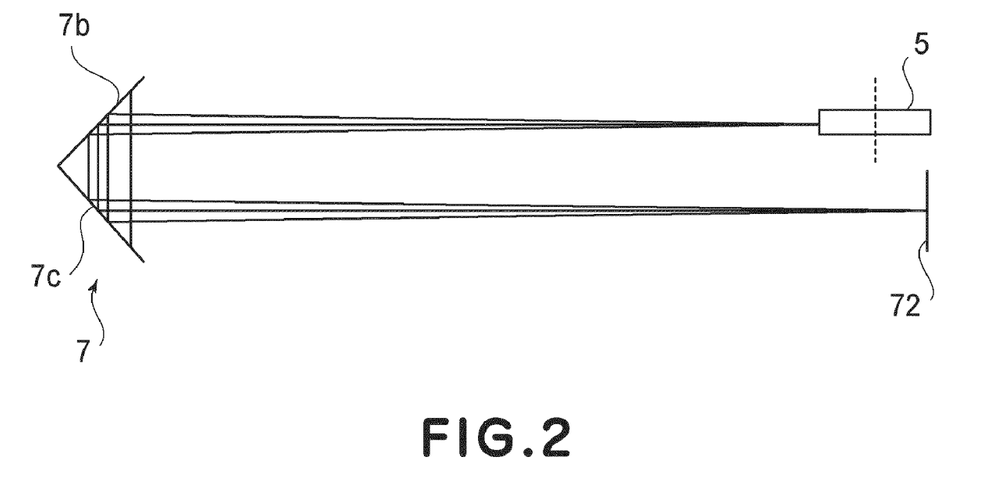
FIG. 2 is a sub-scan sectional view of a synchronism detection optical system in the first embodiment of the present invention.

As shown in FIG. 2, the reflecting prism 7 has a structure in which the two refracting surfaces and two reflection surfaces are unified.

The reflecting prism 7 which is a synchronism detecting optical element serves to deflect a light beam based on the two refracting surfaces and two reflection surfaces thereof, and it directs the light beam onto a light-receiving surface of a synchronism detection sensor 72 which is a synchronism detecting element.

The light beam incident on the prism 7 is imaged on the light-receiving surface of the synchronism detection sensor 72 with respect to each of the main-scan direction and the sub-scan direction, by means of the anamorphic power of the prism 7 which has different powers in the main-scan direction and the sub-scan direction.

Here, the reflecting prism 7 has a positive power both in the main-scan direction and the sub-scan direction.

By using a synchronism detecting light beam detected at the synchronism detection sensor 72 which is a synchronism detecting element, the synchronism detection sensor 72 generates a synchronizing signal for determining the image-writing start position of the of the light beam on the scan surface 8, in the main-scan direction.

Here, the optical system disposed along the light path from the rotary polygonal mirror (polygon mirror) 5 to the synchronism detection sensor 72 which is a synchronism detecting element is defined as a synchronism detection optical system.

FIG. 2 is a diagram showing the synchronism detection optical system of the present embodiment in the sub-scan section.

Figure 3:
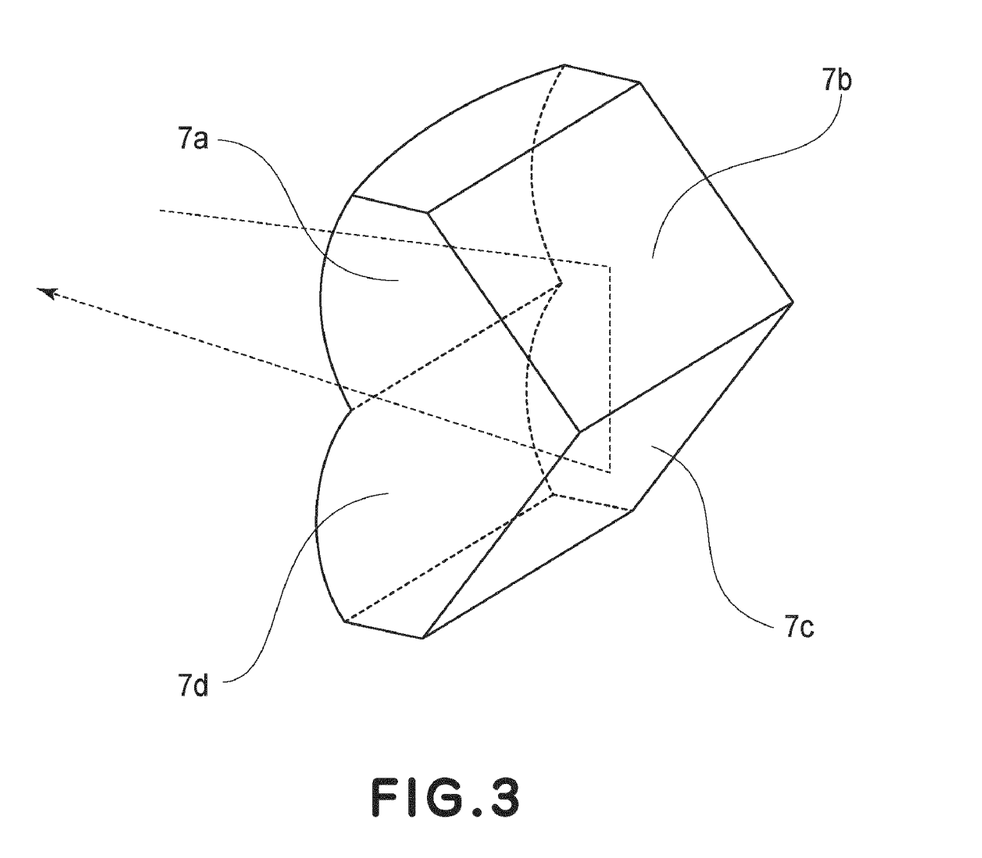
FIG. 3 is a perspective view of a synchronism detecting optical element in the first embodiment of the present invention.

FIG. 3 is a perspective view of the prism 7 which is a synchronism detection optical element.

Referring to FIG. 2, FIG. 3, the synchronism detection optical system of the present embodiment will be explained in detail.

The synchronism detecting light beam which is a portion of the light beam scanningly deflected by the deflecting surface of the rotary polygonal mirror 5, is incident on the light entrance surface 7a of the prism 7 which is a synchronism detecting optical element.

The light entrance surface 7a of the prism 7 has a spherical shape, and it functions to image the synchronism detecting light beam upon the light-receiving surface of the synchronism detecting sensor 72 in the main-scan section.

Then, the synchronism detecting light beam passed through the light entrance surface 7a of the prism 7 is incident on the paired reflection surfaces 7b and 7c which are disposed mutually orthogonally (at 90 deg.) in the sub-scan section).

Both of the reflection surface 7b and reflection surface 7c are comprised of a plane surface, and the reflection surface 7b and reflection surface 7c are a reflection surface having no power in the main-scan direction and the sub-scan direction.

The synchronism detecting light beam passed through the light entrance surface 7a of the prism 7 is deflected by the reflection surface 7b which is plane, in a direction perpendicular to the main-scan section and, thereafter, it is deflected by the reflection surface 7c which is plane, in a direction parallel to the main-scan section.

Subsequently, the synchronism detecting light beam deflected in a direction parallel to the main-scan section is incident on the light exit surface 7d which is a cylindrical surface having a positive power only in the sub-scan direction.

The synchronism detecting light beam collected at the light exit surface 7d of the prism 7 is imaged upon the light-receiving surface of the synchronism detecting sensor 72 in the sub-scan section.

Namely, the deflecting surface of the rotary polygonal mirror 5 and the light-receiving surface of the synchronism detection sensor 72 are placed in an optically conjugate relationship with each other in the sub-scan section, based on the combined power of the light entrance surface 7a and light exit surface 7d of the prism 7 in the sub-scan direction.

With the use of the prism 7 which is the synchronism detecting optical element and which has two refracting surfaces and two reflection surfaces being integrated, the synchronism detection optical system of the present invention accomplishes the following advantageous features.

First, unifying a plurality of reflection surfaces has provided an advantageous effect that the adjustment process for adjusting deviation of the irradiation position of the light beam incident on the light-receiving surface of the synchronism detection sensor 72 which might be caused by a disposition error of each reflection surface of the plurality of reflection surfaces.

If a plurality of reflection surfaces are disposed along the light path, as compared with a case where only one piece of reflection surface is disposed on the light path, there will be a problem that the amount of deviation of the irradiation position of the light beam incident on the light-receiving surface of the synchronism detection sensor 72 which might be caused by the disposition error of each reflection surface of the plurality of reflection surface increases.

This problem then causes degradation of the synchronism detection precision.

If a plurality of reflection surfaces are disposed separately while being spatially spaced apart from each other, along the light path, in order to adjust the deviation of irradiation position of the light beam incident on the light-receiving surface of the synchronism detection sensor 72, each reflection surface must be adjusted individually, and this leads to a problem of complexity of the adjustment process.

In contrast, if a plurality of reflection surfaces are unified, since only one piece of member should be adjusted, the adjustment process is quite simple.

Second, use of a prism 7 in this embodiment as a synchronism detecting optical element having two refracting surfaces and two reflection surfaces being unified, has provided an advantageous effect that the number of component items is reduced.

As shown in FIG. 9, the synchronism detection optical system mounted on conventional optical scanning devices comprises an imaging lens 6 having an imaging performance and a synchronism detecting mirror 71 with a deflection function, which are disposed separately while being spatially spaced apart from each other on the light path. Thus, at least two component items are necessary.

Third, since this embodiment uses a prism having two reflection surfaces which are planes of total reflection surface, the light beam can be deflected easily without a loss of light quantity and without the provision of any special metal membrane at the reflection surface. Thus, an advantageous effect of reduced cost has been provided.

Fourth, the prism 7 is provided with both of the function of correcting the surface tilt of each deflecting surface of the rotary polygonal mirror 5 and the function of correcting the surface tilt of the prism 7 itself.

Initially, the function of correcting the surface tilt of each deflecting surface of the rotary polygonal mirror 5 will be explained in detail.

Each of four deflecting surfaces of the rotary polygonal mirror 5 has a different surface tilt amount in sub-scan section due to the manufacturing error.

Due to the difference in this surface tilt amount of the deflecting surfaces, there will be a problem that, in sub-scan section, the irradiation position of the light beam deflected by the deflection surfaces of the rotary polygonal mirror 5 upon the light-receiving surface of the synchronism detection sensor 72 fluctuates.

In order to solve this problem, in the present embodiment, by means of the prism 7, the deflecting surface of the rotary polygonal mirror 5 and the light-receiving surface of the synchronism detecting element 72 are placed in an optically conjugate relationship with each other in the sub-scan section.

Next, the function of correcting the surface tilt of the prism 7 itself will be explained in detail.

As shown in FIG. 9, the synchronism detection optical system using conventional synchronism detecting mirrors involves a problem of the surface tilt of the reflection surface which is caused by the tilt of the synchronism detecting mirror itself resulting from environmental variations or manufacturing errors.

In order to avoid this in the conventional synchronism detection optical system, some measures have to be taken to avoid that the light beam deviates out of the light-receiving surface of the synchronism detection sensor 73 to cause synchronism detection failure.

To this end, in conventional synchronism detection optical systems, in order to correct the surface tilt of the synchronism detecting mirror 71, a synchronism-detecting tilt correcting lens 73 is provided on the light path before the synchronism detecting element 72, so as to place the synchronism detecting mirror 71 and the synchronism detecting element 72 in an optically conjugate relationship in the sub-scan section.

This results in another problem of increased cost by the addition of the synchronism-detecting tilt correcting lens 73 in the light path.

In the optical scanning device of the present embodiment as well, there will be a problem of surface tilt of the reflection surface if the prism 7 itself is tilted due to environmental variation or a manufacturing error.

In consideration of this, in this embodiment as well, some measures should be taken to avoid that the light beam deviates out of the light-receiving surface of the synchronism detection sensor 73 to cause synchronism detection failure.

To this end, in this embodiment, the synchronism detecting optical element is provided with two reflection surfaces and, in the sub-scan section, these two reflection surface are disposed at a right angle relative to each other.

Figure 4:
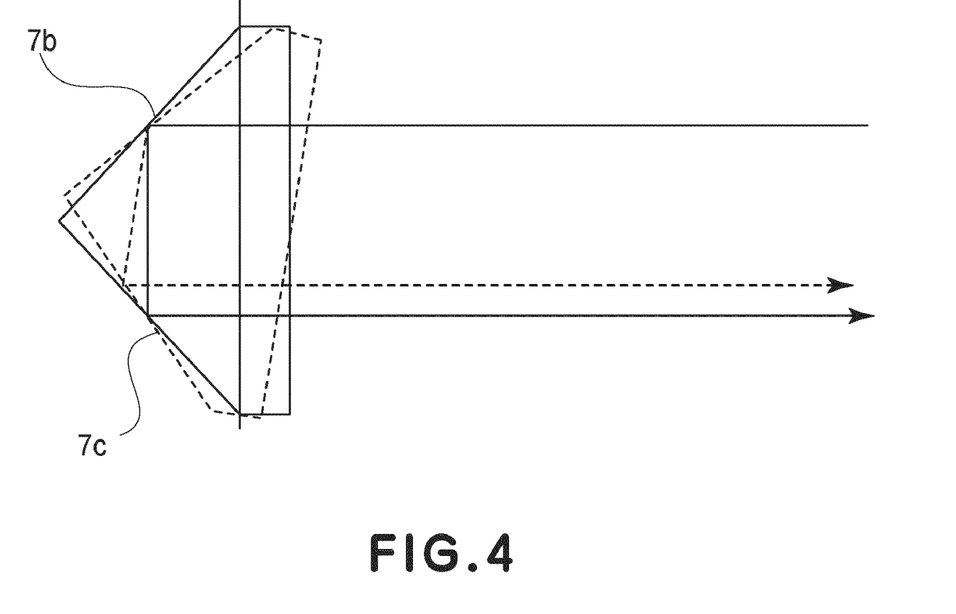
FIG. 4 is a diagram illustrating the influence of the tilt of the synchronism detecting optical element, in the first embodiment of the present invention.

FIG. 4 illustrates the influence, on the light beam, of the tilt of the prism 7 which is a synchronism detecting optical element mounted on the optical scanning device (optics box).

In FIG. 4, solid lines depict the light beam in a case without tilt, and broken lines depict the light beam in a case with tilt.

As described hereinbefore, the prism 7 has a power both in the main-scan direction and the sub-scan direction so as to image the light beam on the light-receiving surface of the synchronism detection sensor 72 in the main-scan section and the sub-scan section.

The light entrance surface 7a is formed into a spherical shaped with a power in the main-scan direction and the sub-scan direction. The light exit surface 7d is formed as a cylindrical surface having a power only in the sub-scan direction.

On the other hand, the deflecting surface of the rotary polygonal mirror 5 and the light-receiving surface of the synchronism detection sensor 72 are placed in an optically conjugate relationship with each other in the sub-scan section by means of the combined power of the light entrance surface 7a and light exit surface 7d of the prism 7 in the sub-scan direction.

Here, for simplicity of explanation, a model with the light entrance surface 7a and light exit surface 7d depicted as a plane is illustrated.

If in the sub-scan section the two reflection surfaces which define a right angle therebetween are tilted without changing that angle, since the light beam goes out with its angle unchanged, the irradiation position of the light beam upon the light-receiving surface of the synchronism detection sensor 72 is mostly unchanged.

In accordance with this embodiment, the tilt correcting function of such prism 7 itself can be accomplished simply and conveniently. Thus, a synchronism-detecting tilt correcting lens 73 such as required in conventional synchronism detection optical systems can be omitted. Hence, an advantageous effect of reduced cost has been provided.

Fifth, in this embodiment, in order to accomplish both of the surface tilt correcting function for individual deflecting surfaces of the rotary polygonal mirror 5 and the surface tilt correcting function for the prism 7 itself, the range of imaging magnification between the deflecting surface of the rotary polygonal mirror 5 and the light-receiving surface of the synchronism detection sensor 72 in the sub-scan direction has been specified.

If the synchronism detecting optical element (prism 7) itself tilts, the position of the light entrance surface 7a and light exit surface 7d having a power in the sub-scan direction changes, too.

This leads to a problem that the optical conjugate relationship between the deflecting surface of the rotary polygonal mirror 5 and the light-receiving surface of the synchronism detection sensor 72 as defined within the sub-scan section is disordered.

The disorder of conjugate relationship can be lowered by making the imaging magnification between the deflecting surface of the rotary polygonal mirror 5 and the light-receiving surface of the synchronism detection sensor 72 in the sub-scan direction, close to unit magnification.

Hence, in this embodiment, the range of the imaging magnification βbd in the sub-scan direction is specified as follows.

$$0.5 < |\beta bd| < 1.5 \quad (1)$$

If the upper limit or lower limit of the numerical range of conditional equation (1) is exceeded, disorder of the optical conjugate relationship between the deflecting surface of the rotary polygonal mirror 5 and the light-receiving surface of the synchronism detection sensor 72 becomes worse, causing a problem that the irradiation position on the light-receiving surface changes largely in response to the tilt of the deflecting surface.

The function and advantageous effects obtainable by satisfying conditional expression (1) above will be explained below in greater detail.

For simplicity of explanation, while the synchronism detecting optical element (prism 7) is treated here as a lens having a thickness=0, paraxial computation is carried out.

The distance along the light path from the deflecting surface of the rotary polygonal mirror 5 to the synchronism detecting optical element (prism 7) is denoted by L1, and the distance along the light path from the prism 7 to the light-receiving surface of the synchronism detection sensor 72 is denoted by L2.

Here, the power $\phi org$ of the prism 7 in the sub-scan direction which is necessary to provide an optical conjugate relationship between the deflecting surface and the light-receiving surface in the sub-scan section is given as follows.

$$\phi org = 1/L1 + 1/L2 = (L1+L2)/(L1 \times L2)$$

The power of the synchronism detecting optical element (prism 7) in the sub-scan direction is set to satisfy this relationship.

Here, it is assumed that the position of the prism 7 shifts by Δ in the light path direction.

The power $\phi move$ of the prism 7 in the sub-scan direction necessary to keep the deflecting surface of the rotary polygonal mirror 5 and the light-receiving surface of the synchronism detection sensor 72 in an optically conjugate relationship with each other in the sub-scan section, at the time, can be expressed as follows.

$$\varphi move = 1/(L1+\Delta) + 1/(L2-\Delta)$$
$$= (L1+L2)/\{L1 \times L2 - (L1-L2) \times \Delta\}$$

Thus, it is seen that, due to the positional change of the prism 7 in the optical path direction, the optical conjugate relationship is disordered.

However, if the imaging magnification βbd between the deflecting surface of the rotary polygonal mirror 5 and the light-receiving surface of the synchronism detection sensor 72 is unit magnification, the last term of the denominator of the above conditional expression disappears. Thus, it follows that:

$$|\beta bd| = L2/L1 = 1$$

$$\phi move = (L1+L2)/(L1 \times L2) = \phi org$$

Hence, under this condition, the positional change in the light path direction of the prism 7 will have no influence on the optical conjugate relationship between the deflecting surface of the rotary polygonal mirror 5 and the light-receiving surface of synchronism detection sensor 72 in the sub-scan section.

For further reducing the problem, the following conditional expression should preferably be satisfied.

$$0.8 < |\beta bd| < 1.2 \quad (2)$$

It is to be noted that, when $|\beta bd|$ in the present embodiment is calculated based on Table 1 below, the result is $|\beta bd|=1.1$. This is within the numerical range of equation (2).

Sixth, this embodiment is so structured that the synchronism detecting light beam passed through the light entrance surface 7a of the reflecting prism 7 is deflected by the reflection surface 7b in a direction perpendicular to the main-scan section and, afterwards, it is deflected by the reflection surface 7c in a direction parallel to the main-scan section.

This enables that the synchronism detecting light beam and the light beam scanningly deflected by the deflecting surface of the rotary polygonal mirror 5 and arriving at the scan surface 8 where the photosensitive drum is disposed, are spatially separated from each other within the sub-scan section.

If the scanningly deflected light beam and the synchronism detecting light beam are spatially separated from each other in the sub-scan section, the degree of dispositional freedom for the synchronism detection sensor 72 is improved significantly.

For example, the synchronism detection sensor 72 can be disposed below the deflective scan surface.

Hence, the synchronism detecting light beam does not scan the deflective scan surface and, therefore, even if the synchronism detecting light beam is scanned, the light beam does not impinge on the imaging optical element 6 placed at the deflective scan surface.

Since the synchronism detecting light beam does not image on the optical element 6, there is an advantageous effect that erroneous detection of synchronizing signal due to unnecessary ghost light is prevented.

Table 1 shows design parameters of the present embodiment.

In this embodiment, within the main-scan section, the reflection type prism 7 which is the synchronism detecting optical element and which has two refracting surfaces and two reflection surfaces being integrated is disposed out of the image effective region.

In the main-scan section, it is disposed between the rotary polygonal mirror 5 and the imaging optical element 6 as viewed in the optical axis direction of the imaging optical system.

Furthermore, the synchronism detecting light beam is bent in sub-scan direction between the rotary polygonal mirror 5 and the imaging optical element 6 as viewed in the optical axis direction of the imaging optical system, and the synchronism detection sensor 72 is disposed at a position 5 mm below the deflective scan surface.

In order to remove the chromatic aberration of magnification which occurs in the synchronism detection optical system due to wavelength variation of the light beam emitted from the semiconductor laser 1, to be caused by an environmental change such as temperature variation, in the synchronism detection optical system the synchronism detecting light beam is arranged not to pass through an end portion of the imaging optical element 6.

Then, in the main-scan section, the optical axis of the reflection type prism 7 and the principal ray of the synchronism detecting light beam arriving at the synchronism detection sensor 72 are made coincident with each other.

In other words, the optical axis of the prism 7 is opposed to the principal ray of the synchronism detecting light beam impinging on the synchronism detection sensor 72.

The focal length in the main-scan direction of the prism 7 which is a synchronism detecting optical element is set to 50 mm. The focal distance of the prism 7 in the main-scan direction is equal to ⅓ of the focal length in the main-scan direction of the toric lens 6 which is an imaging optical element. Thus, both of improvement of the synchronism detecting precision and reduction in size of the synchronism detection optical system are accomplished.

In Table 1, Rm (unit: mm) denotes the curvature radius in the main-scan direction, Rs (unit: mm) denotes the curvature radius in the sub-scan direction, d (unit: mm) denotes the surface spacing, and n denotes the refractive index.

In FIG. 1, the angle defined between the optical axis of the input optical system and the principal ray of the synchronism detecting light beam incident on the synchronism detecting optical element 7, in the main-scan section, is 20 degrees.

[Table 1]

TABLE 1

| | | Rm | Rs | d | n |
|---|---|---|---|---|---|
| | Deflecting Surface | 5a | infinite | 50 | |
| Synchronism | Refracting Surface | 7a | 44.380 | 2 | 1.5242 |
| Detecting | Reflecting Surface | 7b | infinite | 5 | 1.5242 |
| Optical | Reflecting Surface | 7c | infinite | 2 | 1.5242 |
| Element | Refracting Surface | 7d | infinite −24.282 | 50 | |
| | Synchronism Detecting Sensor | 72 | infinite | | |

Figure 5:
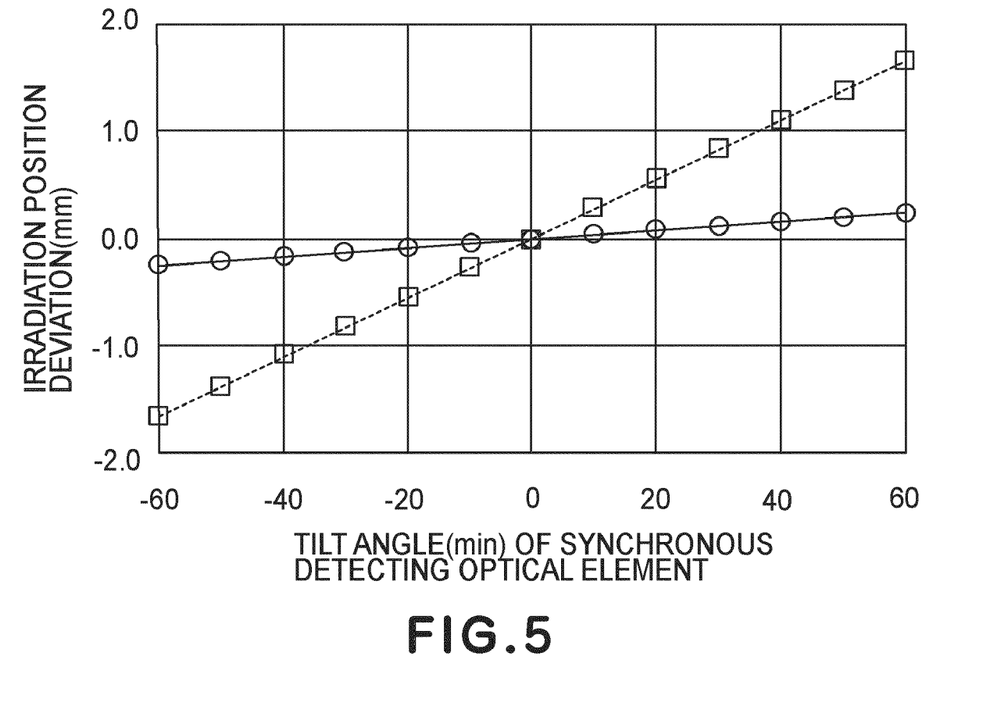
FIG. 5 is a diagram illustrating the irradiation position when the synchronism detecting optical element of the first embodiment of the present invention is tilted in the sub-scan section.

FIG. 5 illustrates at solid lines the irradiation position of the light beam on the light-receiving surface of the synchronism detection sensor 72 when, in the present embodiment, the synchronism detecting optical element 7 tilts in the sub-scan section.

Here, the irradiation position of the light beam on the light-receiving surface refers to the imaging position of the light beam in the sub-scan direction.

The axis of ordinate of FIG. 5 denotes deviation of the irradiation position of the light beam (deviation of imaging position of the light beam in the sub-scan direction) on the light-receiving surface.

The axis of abscissas of FIG. 5 denotes the tilt angle in the sub-scan section of the prism 7 which is a synchronism detecting optical element.

The broken line illustrates deviation of the irradiation position of the light beam on the light-receiving surface of the synchronism detection sensor 72 when the synchronism detecting mirror 71 disposed inside the conventional optical scanning device of FIG. 9 (comparative example) tilts in the sub-scan section.

It is seen from FIG. 9 that the tilt correcting function for the prism 7 which is a synchronism detecting optical element works well such that, even if the prism 7 tilts in the sub-scan section, there is substantially no shift of irradiation position of the light beam on the light-receiving surface of the synchronism detection sensor 72.

Furthermore, in this embodiment, since the deflecting surface of the rotary polygonal mirror 5 and the light-receiving surface of the synchronism detection sensor 72 are placed in an optically conjugate relationship with each other in the sub-scan section, even if all the four deflecting surfaces of the rotary polygonal mirror 5 cause surface tilt, it does not cause shift of the irradiation position of the light beam on the light-receiving surface of the synchronism detection sensor 72.

It is to be noted that in this embodiment the semiconductor laser 1 which is light source means is comprised of a single beam laser having a single light emission point.

However, in the present invention, it may be a monolithic multi-beam laser having a plurality of light emission points being independently modulated.

The light emission points of the monolithic multi-beam laser are spaced apart from each other both in the main-scan direction and the sub-scan direction.

When a monolithic multi-beam laser is used, since the light beam are spaced apart from each other in the sub-scan direction on the light-receiving surface of the synchronism detection sensor, the maximum allowable limit for the drift of the irradiation position (imaging position drift in the sub-scan direction of the light beam) of the light beam on the light-receiving surface would be more strict.

Therefore, in the case of a monolithic multi-beam laser, the tilt compensation effect of the synchronism detecting optical element which is one advantageous effect of the invention will be more efficiently made use of.

Figure 6:
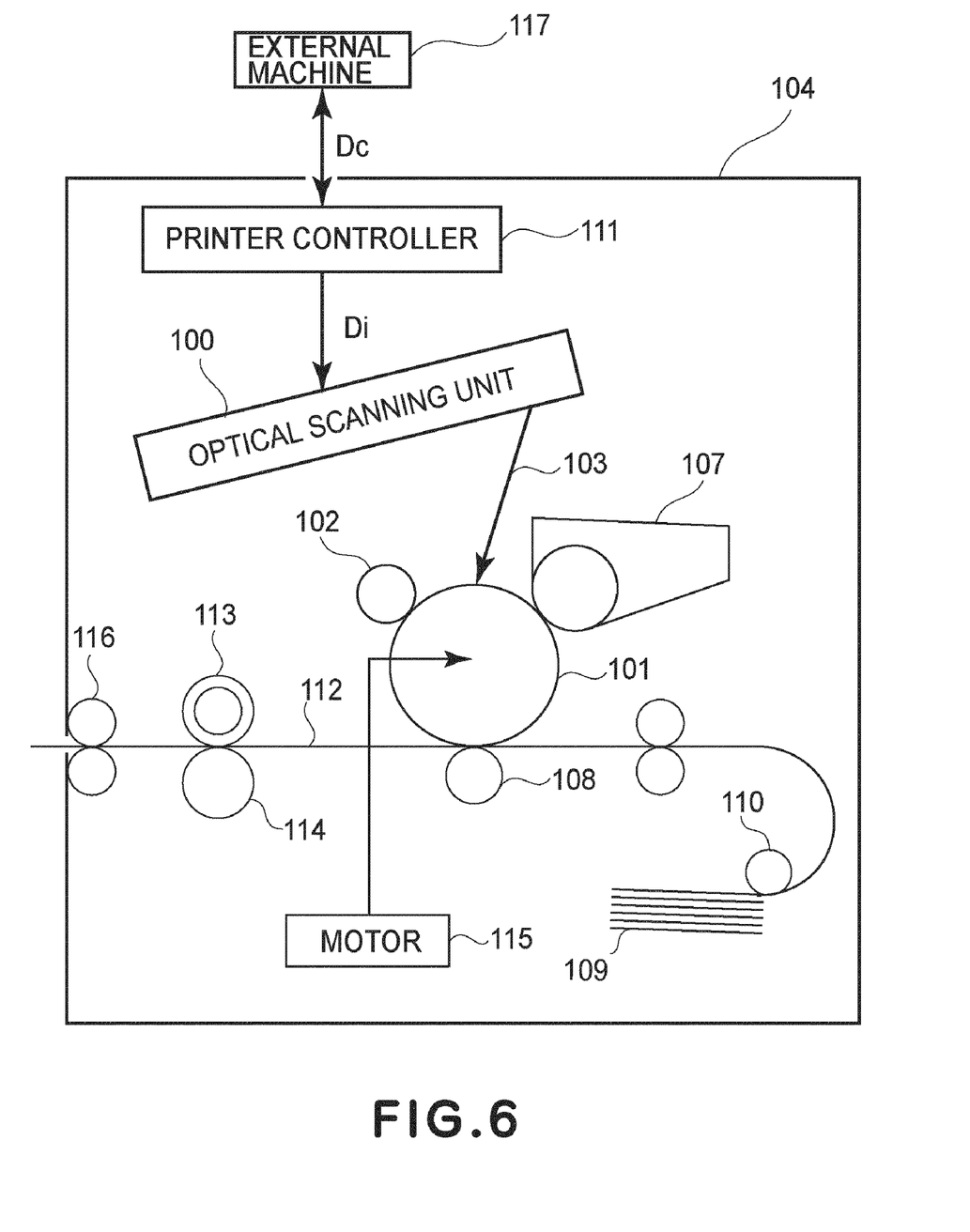
FIG. 6 is a diagram illustrating an image forming apparatus according to the present invention.

FIG. 6 is a sectional view in the sub-scan direction of a main portion of an image forming apparatus according to an embodiment of the present invention.

Denoted in FIG. 6 at 104 is an image forming apparatus having a printer controller 111.

The image forming apparatus 104 receives code data Dc supplied thereto from an external machine 117 such as a personal computer, for example. The code data Dc is then transformed by a printer controller 111 inside the apparatus, into imagewise data (dot data) Di.

The imagewise data Di transformed from the code data Dc by the printer controller 111 is then inputted into an optical scanning device 100 of FIG. 1 having a structure described with reference to the first embodiment.

The optical scanning device 100 produces a light beam 103 having been modulated in accordance with the imagewise data Di, and with this light beam 103, the photosensitive surface of the photosensitive member (photosensitive drum) 101 is scanned in the main-scan direction.

The photosensitive drum 101 which is an electrostatic latent image bearing member (photosensitive member) is rotated clockwise by means of a motor 115. Through this rotation, the photosensitive surface of the photosensitive drum 101 is moved relatively to the light beam 103, in the sub-scan direction which is orthogonal to the main-scan direction.

Disposed just above the photosensitive drum 101 is a charging roller 102 which is in contact with the photosensitive drum surface to electrically charge the drum surface uniformly. Onto the photosensitive drum 101 surface having been electrically charged by the charging roller 102, the light beam 103 being scanned by the optical scanning device 100 is projected.

As described above, the light beam 103 has been modulated in accordance with the imagewise data Di. By irradiating the photosensitive drum 101 with this light beam 103, an electrostatic latent image is formed on the photosensitive drum 101 surface. The electrostatic latent image thus formed is then developed into a toner image, by means of a developing device 107 which is provided at a position downstream of the irradiation position of the light beam 103 with respect to the rotational direction of the photosensitive drum 101 and which is in contact with the photosensitive drum 101.

The toner image thus developed by the developing device 107 is transferred onto a transfer sheet (transfer material) 112 below the photosensitive drum 101, by means of a transfer roller 108 which is disposed opposed to the photosensitive drum 101.

Transfer sheets 112 are stored in a sheet cassette 109 in front of the photosensitive drum, but these can be supplied manually. There is a sheet supplying roller 110 at an end portion of the sheet cassette 109, for supplying each sheet 112 in the cassette 109 into a sheet supply path.

The paper sheet 112 having an unfixed toner image transferred thereto in the manner described above is conveyed to a fixing device behind (at the left-hand side as viewed in the drawing) the photosensitive drum 101. The fixing device comprises a fixing roller 113 having a built-in fixing heater (not shown) and a pressing roller 114 disposed to be press-contacted to the fixing roller 113. The transfer sheet 112 supplied from the image transfer station is heated under pressure at the press contact area between the fixing roller 113 and the pressing roller 114, whereby the unfixed toner image on the transfer sheet 112 is fixed thereon.

Behind the fixing roller 113, there are sheet discharging rollers 116 which function to discharge the image-fixed sheet 112 out of the image forming apparatus.

In FIG. 6, the print controller 111 has various functions in addition to the data conversion function described hereinbefore from code data Dc to imagewise data Di, such as for controlling the motor 115 or any other components inside the image forming apparatus as well as a polygon motor inside the optical scanning device.

Embodiment 2

Figure 7:
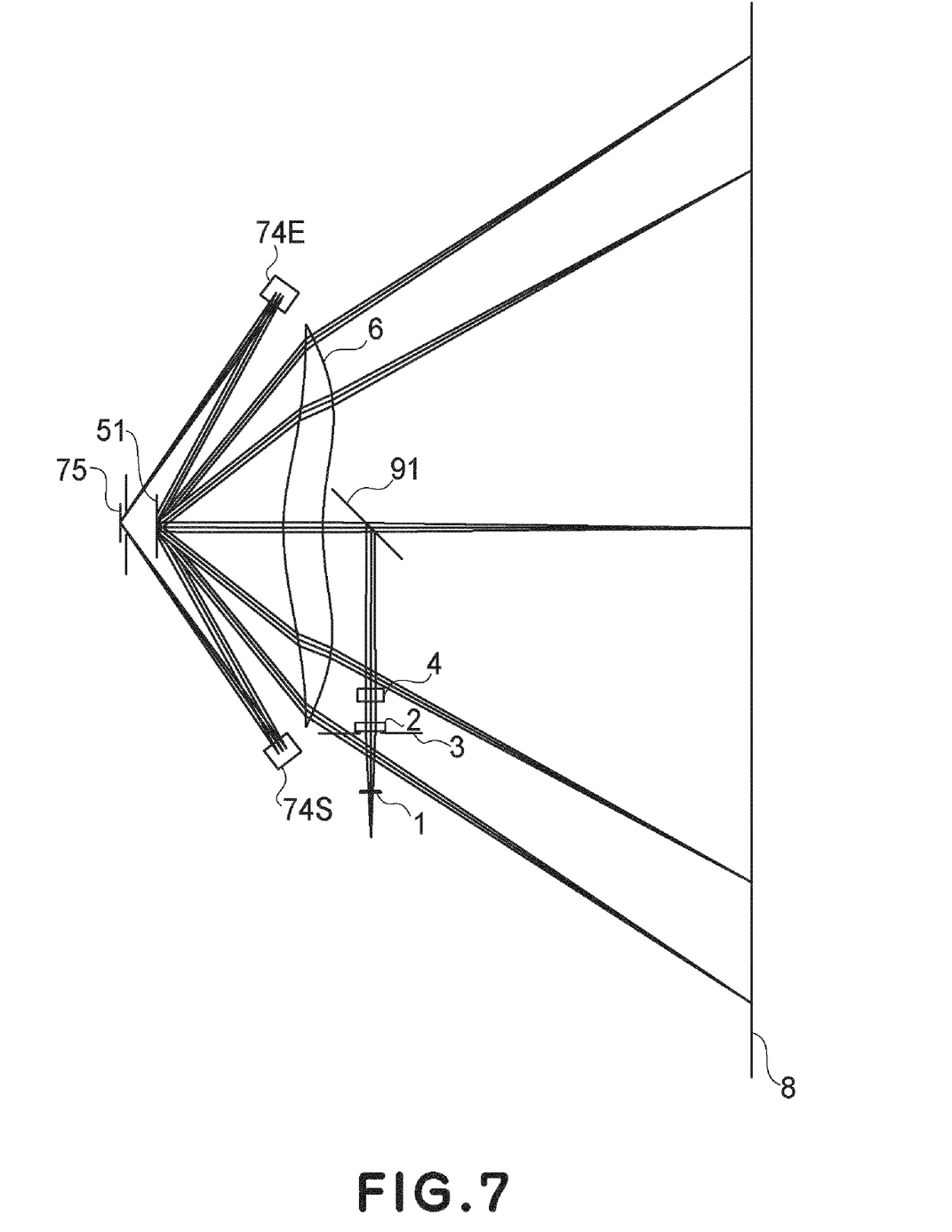
FIG. 7 is a main-scan sectional view of an optical scanning device according to a second embodiment of the present invention.

FIG. 7 is a main-scan sectional view of an optical scanning device according to a second embodiment of the present invention.

Figure 8:
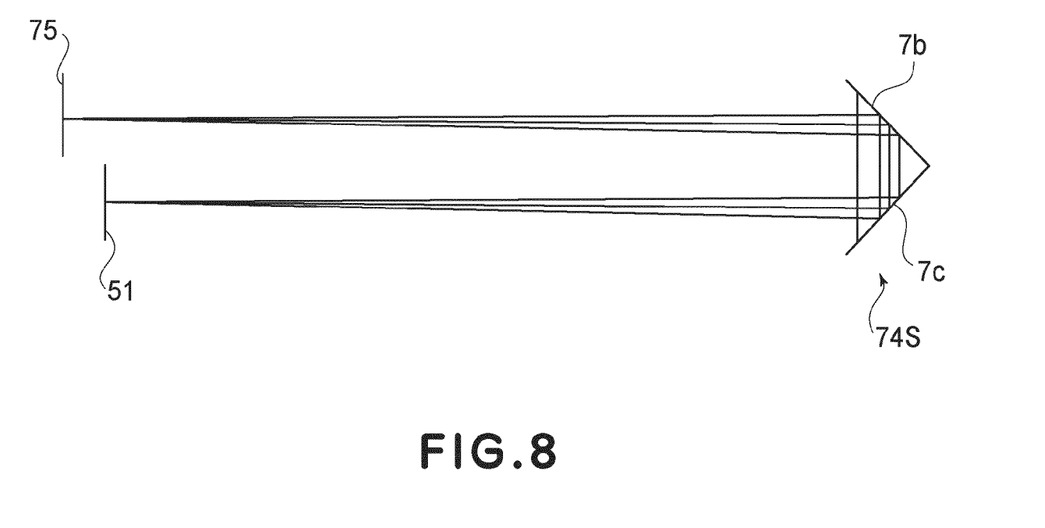
FIG. 8 is a sub-scan sectional view of a synchronism detection optical system in the second embodiment of the present invention.

FIG. 8 is a sub-scan sectional view of the synchronism detection optical system of the second embodiment of the present invention.

The second embodiment differs from the first embodiment in that synchronism detecting optical elements 74S and 74E are disposed at both sides of the image-writing start position side (scan start side) outside the image effective region and the image-writing completion position side (scan end side) thereof.

The synchronism detecting optical element 74S which generates a first synchronizing signal is referred to as first synchronism detecting optical element.

On the other hand, the synchronism detecting optical element 74E which generates a second synchronizing signal is referred to as second synchronism detecting optical element.

The second embodiment further differs from the first embodiment in that the rotary polygonal mirror which is an optical deflector is changed to a resonance type optical deflector (galvano mirror).

The remaining portions of the second embodiment are similar to the first embodiment.

In the present second embodiment as well, in order to accomplish both of the surface tilt correction function for the deflecting surfaces of the rotary polygonal mirror 5 and the surface tilt correction function for the prisms 74S and 74E themselves, the imaging magnification between the deflecting surface of rotary polygonal mirror 5 and the light-receiving surface of synchronism detection sensor 72 in the sub-scan direction is set to $|\beta bd|=1.1$.

The light beam emitted from the semiconductor laser 1 which is light source means is converted into parallel light by a collimator lens 2.

The light beam converted into parallel light goes through a stop 3 by which the width (light quantity) of the light beam is restricted. Then, it is incident on a cylindrical lens 4 having a power only in the sub-scan direction.

Since the cylindrical lens 4 has no power, in the main-scan direction the light beam passed through the cylindrical lens 4 is incident on the resonance type optical deflector 5 which is an optical deflector, as a parallel light beam in the main-scan section.

The resonance type optical deflector 51 is a deflecting element which reciprocally moves around a rotational axis which is parallel to the sub-scan direction.

Through the reciprocal motion of the resonance type optical deflector 51, the light beam reciprocally scans the scan surface 8.

Furthermore, within the sub-scan section, the light beam passed through the cylindrical lens 4 is imaged on the deflecting surface of the resonance type optical deflector 5 by the cylindrical lens 4 having a power in the sub-scan direction.

The light beam projected from the cylindrical lens 4 is deflected by an input mirror 91 and is incident on the resonance type optical deflector 51 within the sub-scan section and at an a finite angle relative to the optical axis of the imaging optical system.

The collimator lens 2, stop 3 and cylindrical lens 4 constitute an input optical system.

Thus, the light beam incident on the resonance type optical deflector 51 forms a line image being elongated in the main-scan direction.

The light beam deflected by the deflecting surface of the resonance type optical deflector 51 is incident on an imaging optical element 6 having an fθ characteristic, constituting an imaging optical system.

In the present embodiment, the imaging optical element constituting an imaging optical system is comprised of one piece of plastic toric lens 6. However, the present invention is not limited to this.

Plastic toric lens 6 has different powers in the main-scan direction and the sub-scan direction, respectively, and it serves to image the light beam scanningly deflected by the deflecting surface of the resonance type optical deflector 51 upon a scan surface to be scanned.

Here, the toric lens 6 is a lens having a positive power both in the main-scan direction and the sub-scan direction.

The plastic toric lens 6 functions to place the deflecting surface of the resonance type optical deflector 51 and the scan surface 8 where a photosensitive drum is to be disposed, in an optically conjugate relationship with each other within the sub-scan section.

The light beam scanningly deflected by the deflecting surface of the resonance type optical deflector 51 through the reciprocating operation thereof reciprocally scans the scan surface 8.

However, in the present embodiment, only one of the light beam in the forward stroke scan and the light beam in the backward stroke scan, of the reciprocal scan, is used for the image writing within the image effective region on the scan surface based on the light beam.

However, the image writing of the present invention within the image effective region on the scan surface based on the light beam is not limited to the single-direction scan. In the present invention, the image writing may be made based on reciprocal scan.

The bilateral light beams scanningly deflected by the deflecting surface of the resonance type optical deflector 51 and arriving at the opposite sides out of the image effective region on the scan surface 8, are detected by the same synchronism detection sensor 75, such that two synchronizing signals are generated from the synchronism detection sensor 75.

The first synchronizing signal and the second synchronizing signal are those signals for determining the image writing start position of the light beam on the scan surface in the main-scan direction and the writing image width of the light beam on the scan surface, etc.

If a resonance type optical deflector 51 is used as an optical deflector, two synchronizing signals should be detected. The reason therefor is as follows.

In the resonance type optical deflector 51, as compared with the rotary type optical deflector such as a polygon mirror, there is an amplitude center of reciprocal motion thereof and adjustment of the amplitude itself is necessary.

Hence, in the main-scan section, based on the synchronizing signals from the synchronism detecting optical elements 74S and 74E which are disposed at both sides out of the image effective region, the optical deflector is controlled to adjust the amplitude and frequency, etc. of the deflecting surface to predetermined values.

Furthermore, correction may be made based on the synchronizing signals from the two synchronism detecting optical elements 74E and 74S to change the writing image width of the light beam on the scanned surface so that the jitter of the optical deflector or the magnification change due to a change of wavelength of the light beam from the light source means is reduced.

Then, the state of reciprocal operation of the resonance type optical deflector 51 (e.g., resonance frequency of the resonance type optical deflector 51) is controlled based on the first synchronizing signal and the second synchronizing signal produced from the synchronism detection sensor 75 which is a synchronism detecting element, and the image writing start position of the light beam on the scanned surface in the main-scan direction and the writing image width of the light beam on the scanned surface, for example, are controlled.

For these reasons, in this embodiment, the synchronism detecting optical elements 74S and 74E are disposed at both sides out of the image effective region in the main-scan section, by which a first synchronizing signal for the image writing start position side (scan start side) and a second synchronizing signal for the writing completion side (scan end side) are obtained.

In the main-scan section, a portion of the light beam at the image writing start side, deflected by the deflecting surface of the resonance type optical deflector 5, is directed through a synchronism detecting optical element 74S to the light-receiving surface of a synchronism detecting sensor 75 which is disposed at the back of the resonance type optical deflector 51.

Namely, in the main-scan section, the synchronism detecting sensor 75 is disposed at a side of the resonance type optical deflector 51 which is remote from the toric lens 6, as viewed in the optical axis direction of the imaging optical system.

Similarly, in the main-scan section, a portion of the light beam at the image writing end side, deflected by the deflecting surface of the resonance type optical deflector 5, is imaged through a synchronism detecting optical element 74E on the light-receiving surface of a synchronism detecting sensor 75 which is disposed at the back of the resonance type optical deflector 51.

Namely, the light beam passed through the reflection type prism 74S which is the first synchronism detecting optical element and the light beam passed through the reflection type prism 74E which is the second synchronism detecting optical element, are incident on the same synchronism detecting sensor 75.

Hence, the synchronism detecting sensor 75 generates a first synchronizing signal for determining the image writing start position and the writing image width and a second synchronizing signal for determining the image writing start position and writing image width of the light beam on the scanned surface 8.

In main-scan section, as viewed in the optical axis direction of the imaging optical system, the synchronism detecting sensor 75 is disposed at a side of the resonance type optical deflector 51 remote from the toric lens 6 which is an imaging optical element, and outside the image effective region.

Therefore, in the main-scan section, as shown in FIG. 7, the synchronism detection optical systems at both of the image writing start position side (scan start side) and the image writing completion side (scan end side) can be made compact and they can be disposed symmetrically.

Furthermore, there is an additional advantageous effect that, in the main-scan section, the incidence angle of two incident light beams incident on the same synchronism detection sensor 75 is reduced.

Here, the incidence angle of the light beam incident on the synchronism detecting sensor 75 can be defined as the angle which is defined in the main-scan direction between the principal ray of the light beam incident on the synchronism detection sensor 75 and the optical axis of the imaging optical system.

The two synchronism detecting optical elements 74S and 74E are comprised of a reflection type prism like the first embodiment, wherein two refracting surfaces 7a and 7d and two reflection surfaces 7b and 7c making a right angle in the sub-scan section are integrated.

Both of the reflection surface 7b and reflection surface 7c are comprised of a plane surface, and the reflection surface 7b and reflection surface 7c are a reflection surface having no power in the main-scan direction and the sub-scan direction.

Each of the reflection type prism 74E which is the first synchronism detecting optical element and the reflection type prism 74S which is the second synchronism detecting optical element, of the present embodiment, have the structure shown in FIG. 3.

More specifically, each of the light entrance surfaces 7a of the two synchronism detecting optical elements 74S and 74E is formed with a spherical shape, and these have a power both in the main-scan direction and the sub-scan direction.

Each of the light exit surfaces 7d of the two synchronism detecting optical elements 74S and 74E is formed by a cylindrical surface having a power only in the sub-scan direction.

The deflecting surface of the deflector and the light-receiving surface of the synchronism detection sensor 72 are placed in an optically conjugate relationship with each other in the sub-scan section, based on the combined power of the light entrance surfaces 7a and light exit surfaces 7d of the reflection type prisms 74S and 74E in the sub-scan direction.

The two reflection surfaces (plane surfaces) of the reflection type prism 74S which is the first synchronism detecting optical element and of the reflection type prism 74E which is the second synchronism detecting optical element, define a right angle in the sub-scan section.

Thus, as described above, like the first embodiment, the present embodiment has accomplished the first advantageous effect, second advantageous effect, third advantageous effect, fourth advantageous effect, fifth advantageous effect and sixth advantageous effect having been described with reference to the first embodiment.

Furthermore, in the present second embodiment, since a prism of the structural shown in FIG. 3 is used, there is no necessity of providing a synchronism-detecting tilt correcting lens 73 of conventional optical deflecting device (FIG. 9) in the light path in front of the synchronism detection sensor 75.

Since as shown in FIG. 7, in the main-scan section, two light beams are incident on the same synchronism detection sensor 75, providing the synchronism detecting tilt correcting lens 73 of conventional example (FIG. 9) on the light path before the synchronism detection sensor 75 in association with the two light beams is no more possible.

If the synchronism detecting tilt correcting lens 73 is going to be disposed at the light path just before the synchronism detection sensors 75 for the two light beams, there will be a problem that two synchronism detecting tilt correcting lenses interfere with each other.

Hence, the present embodiment provides an advantageous effect that two synchronism detecting light beams are received by the same synchronism detection sensor 75 while assuring the compactness of the synchronism detecting optical system. Thus, there is an additional advantageous effect of further reduction of cost.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2007-150301 filed Jun. 6, 2007, for which is hereby incorporated by reference.

What is claimed is:

1. An optical scanning device, comprising:
    light emitting means;
    a resonance-type optical deflector configured to scan a scan surface reciprocally in a main-scan direction and configured to scanningly deflect a light beam emitted from said light emitting means;
    an imaging optical system configured to image the light beam scanningly deflected by a deflecting surface of said resonance-type optical deflector, upon a scan surface to be scanned;
    a synchronism detecting element configured to detect the light beam scanningly deflected by the deflecting surface of said resonance-type optical deflector, to determine an image-writing start position of the light beam on the scan surface in the main-scan direction; and
    first and second synchronism detecting optical elements configured to direct the light beam scanningly deflected by the deflecting surface of said resonance-type optical deflector to said synchronism detecting element,
    wherein each said synchronism detecting optical element is comprised of a prism having a plurality of reflecting surfaces being unified and having a power in a sub-scan direction,
    wherein, in a sub-scan section, said prism is configured to place the deflecting surface of said resonance-type optical deflector and a light-receiving surface of said synchronism detecting element in an optically conjugate relationship with each other,
    wherein said optical synchronism detecting optical elements are provided respectively at each of an image-writing starting side and an image-writing ending side, outside an effective image region within a main-scan section,
    wherein a first synchronous signal is generated based on a light beam passed through said first synchronism detecting optical element disposed at the image-writing starting side outside the effective image region, in the main-scan section scanned by the deflecting surface of said resonance-type optical deflector,
    wherein a second synchronous signal is generated based on a light beam passed through said second synchronism detecting optical element disposed at the image-writing ending side outside the effective image region, in the main-scan section scanned by the deflecting surface of said resonance-type optical deflector, and
    wherein the light beam passed through said first synchronism detecting optical element and the light beam passed through said second synchronism detecting optical element are incident on the same synchronism detecting element.

2. An image forming apparatus, comprising:
    an optical scanning device as recited in claim 1;
    a photosensitive drum disposed at a scan surface to be scanned;
    a developing device for developing an electrostatic latent image formed on said photosensitive drum surface with a light beam scanningly deflected by said optical scanning device, to produce a toner image;
    a transferring device for transferring the developed toner image onto a transfer material; and
    a fixing device for fixing the transferred toner image, on the transfer material.

3. An image forming apparatus, comprising:
    an optical scanning device as recited in claim 1; and
    a printer controller for converting code data supplied from an outside machine into an image-wise signal and for inputting the image-wise signal into said optical scanning device.

* * * * *